Patented Aug. 3, 1937

2,089,095

UNITED STATES PATENT OFFICE 2,089,095

SOLDERING FLUX

Paul La Frone Magill, Ransomville, N. Y., assignor to E. I. du Pont de Nemours & Company, Wilmington, Del., a corporation of Delaware No Drawing. Application April 24, 1936,
Serial No. 76,263

12 Claims. (Cl. 148—25)

This invention relates to a soldering flux and particularly to an improved liquid or paste soldering flux.

It is common practice frequently to employ a solution of an active fluxing agent, prepared using either water or an organic liquid as a solvent, as a solder flux. The solvents commonly employed for such purposes generally have no beneficial effects other than to act as a carrier for the fluxing agent. In addition, many solvents commonly employed are volatilized at temperatures below soldering temperatures so that they have no solvent action at or near the soldering temperature. Another disadvantage of the various solvents now used is that they usually do not reduce the corrosiveness of chloride flux ingredients or acid decomposition products of such ingredients.

An object of the present invention is a solvent which is liquid at ordinary temperatures and is well adapted for use in the preparation of a liquid or paste soldering flux. Another object is a solvent having a relatively high boiling point which decomposes at or near soldering temperatures without leaving an objectionable residue. A further object is a solvent which reduces the corrosive nature of a flux composition having present corrosive constituents. An additional object is an improved, fast soldering, efficient liquid or paste soldering flux suitable for use in joining metals in general. These and other objects will be hereinafter apparent.

These objects are accomplished in accordance with the present invention by employing formamide as a constituent of a soldering flux composition.

I have found that the properties of formamide make it exceptionally well-suited for use in soldering flux compositions. Formamide is a low molecular weight liquid which boils with decomposition at about 210–215° C. Decomposition at or near its boiling point produces ammonia. Formamide is a solvent for a wide variety of both inorganic and organic substances and is an especially good solvent for most of the inorganic and organic substances that are commonly employed as fluxing agents. In addition formamide is relatively non-corrosive and acts to a slight extent as a fluxing agent itself, probably because of its reducing action and excellent solvent properties.

These unique properties of formamide make possible the preparation of improved, fast soldering, highly efficient soldering flux compositions by using formamide as a constituent in such compositions. Since formamide is a liquid at ordinary temperatures, liquid fluxes may be conveniently prepared from any of the commonly used fluxing agents in combination with formamide. Liquid fluxes are especially advantageous for use since they may be conveniently applied to metal surfaces in a uniform manner. The high boiling point of formamide insures against its removal at temperatures far below soldering temperatures and thus affords a solvent for the fluxing agent at or near soldering temperatures. Furthermore, when formamide decomposes at or near soldering temperatures, it does so without leaving an objectionable or unused residue.

If desired, formamide alone may be used as a fluxing agent when a strong agent is not required, probably because of its reducing action and excellent solvent properties. However, I prefer to use formamide in combination with other fluxing agents. A combination of formamide with metallic chlorides, particularly zinc chloride, produces a soldering flux that is more efficient and less corrosive than the ordinary zinc chloride fluxes. Combinations of formamide may be used with other metallic chlorides such as iron chloride or ammonium chloride, or it may be used in combination with mixtures containing other inorganic salts, such as copper sulfate, and hydrochloric acid. A combination of formamide with zinc chloride when used as a flux leaves a residue which is also less corrosive than residues formed when the ordinary zinc chloride fluxes are used. The acidity of the residue from such a mixture is apparently more or less neutralized by formamide decomposition products, such as ammonia.

Formamide may be used in flux compositions containing metallic chlorides, such as zinc chloride, as the active fluxing agent with or without the presence of water. It is advantageous to avoid the presence of water or large amounts of water in fluxing compositions in order to avoid excessive splashing, and sputtering when the flux is applied to a heated surface or when a surface covered with the flux is heated.

The following flux composition prepared from zinc chloride and formamide has been found to be more efficient than the common zinc chloride fluxes.

Example 1

|  | Parts by weight |
|---|---|
| Formamide | 204 |
| Zinc chloride | 20 |
| Water | 10 |

Example 2

The same as Example 1 without the presence of water.

These flux compositions facilitated a rapid flow of solder onto the metal surfaces which were united and in this respect were markedly superior to a plain zinc chloride solution or a zinc chloride solution containing hydrochloric acid.

Formamide also may be advantageously used as a solvent or constituent of the so-called non-corrosive soldering fluxes which do not contain inorganic chlorides. Such a non-corrosive soldering agent may be among others, rosin or lactic acid. Due to its extensive solvent action, liquid soldering fluxes may be prepared using formamide in combination with any of the non-corrosive fluxing agents which are well-suited for use in soldering various metals for which corrosive fluxes cannot be used.

Formamide also may be used in accordance with the present invention in combination either with inorganic acids such as hydrochloric acid or with organic acids such as lactic acid. Formamide in combination with, e. g., hydrochloric acid increases the efficiency of the cleaning action of the acid and facilitates rapid flow of the solder uniformly over the surfaces of the metals being joined. The following composition was found to be an excellent solder flux:

Example 3

| | Parts by volume |
|---|---|
| Formamide | 170 |
| Hydrochloric acid solution, specific gravity 1.2 | 30 |

When zinc chloride is added to formamide, a slow reaction occurs under proper conditions to produce zinc formamide or zinc formamide containing formamide of crystallization, e. g., when zinc chloride is added to formamide and allowed to stand at ordinary temperatures for several weeks, zinc formamide will begin to crystallize from the mixture. The product may combine with two or more molecules of formamide dependent upon the conditions under which it is kept.

Such reaction products of zinc chloride or other metallic chlorides with formamide also may be used in accordance with the present invention as a soldering flux or as a constituent of a soldering flux composition. They may be conveniently used in the form of a paste or dissolved in a suitable solvent. When used in a paste composition, formamide may be employed as the sole liquid material or other suitable liquids may be added.

In addition to the use of formamide in the preparation of liquid fluxes, it also may be effectively used to form soldering fluxes in paste form containing any of the well known fluxing agents. Such paste compositions are suitable for use in hollow, or cored wire solders.

The examples herein given are for a few of the fluxing compositions that may be prepared employing formamide or its reaction products. Various other compositions which will be obvious to those skilled in the art are understood to be a part of the present invention.

I claim:

1. A soldering flux comprising formamide and a metallic salt.
2. A soldering flux comprising formamide and a metallic chloride.
3. A soldering flux comprising formamide and zinc chloride.
4. A soldering flux comprising formamide and an acid.
5. A soldering flux comprising a fluxing agent and a reaction product of formamide and a metallic chloride.
6. A soldering flux comprising a fluxing agent and a reaction product of formamide and zinc chloride.
7. A soldering flux comprising substantially 170 parts by volume of formamide and 30 parts by volume of an aqueous hydrochloric acid solution, specific gravity 1.2.
8. A soldering flux comprising substantially 204 parts by weight of formamide, 20 parts by weight of zinc chloride and 10 parts by weight of water.
9. A soldering flux comprising substantially 204 parts by weight of formamide and 20 parts by weight of zinc chloride.
10. A soldering flux comprising zinc formamide and formamide in an amount sufficient to convert said flux into a paste.
11. In the art of soldering the step of preparing the metal surfaces to facilitate the flow of solder thereon comprising applying to said surfaces a soldering flux comprising formamide and zinc chloride.
12. In the art of soldering the step of preparing the metal surfaces to facilitate the flow of solder thereon comprising applying to said surfaces a soldering flux comprising formamide and hydrochloric acid.

PAUL LA FRONE MAGILL.